Dec. 17, 1968   G. I. GOODWIN ET AL   3,416,908
ENVIRONMENTAL CONTROL SYSTEM FOR GLASS MANUFACTURING
Filed Feb. 1, 1966                                   2 Sheets-Sheet 1
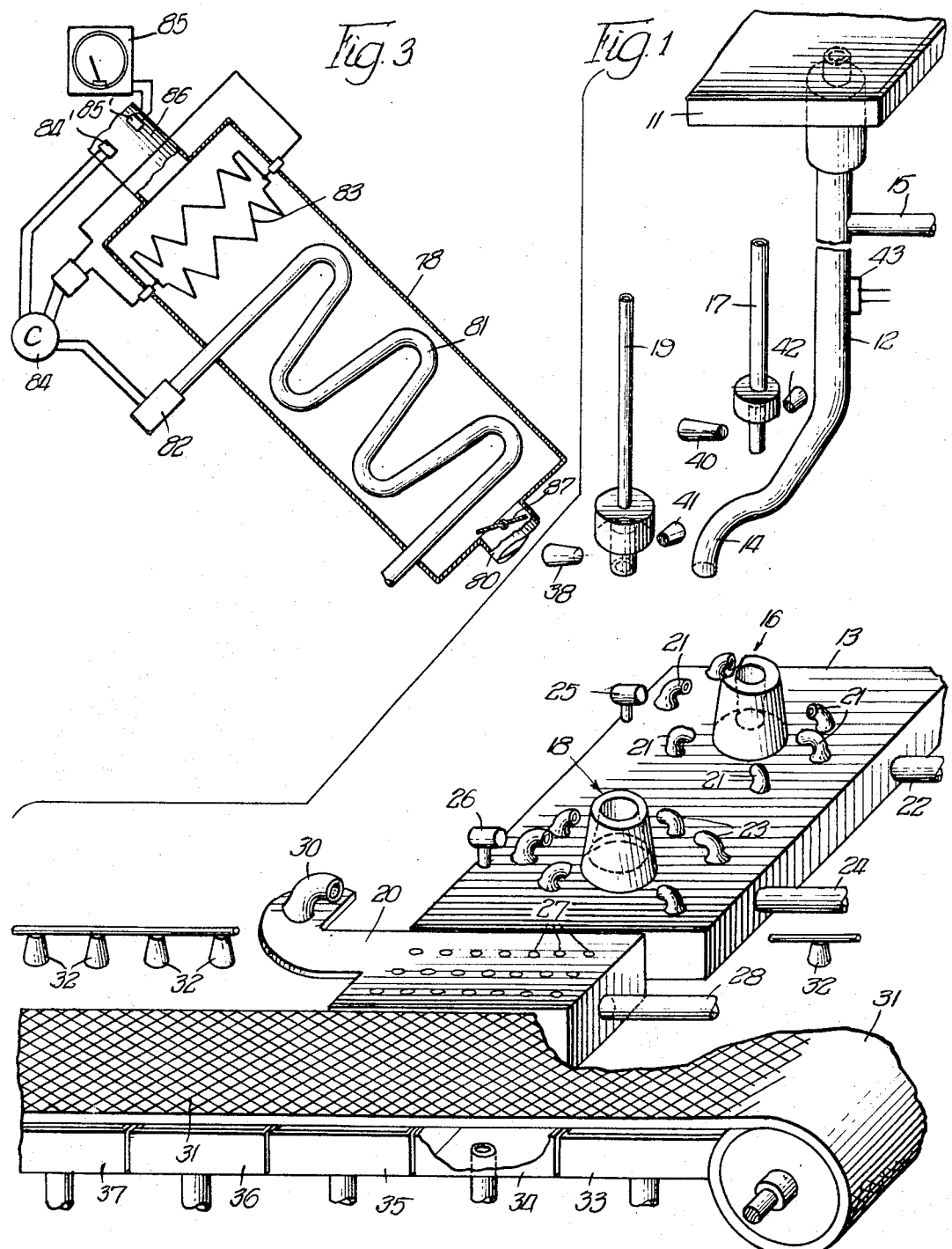
Inventors:
George I. Goodwin,
Robert C. Coblentz,
Burns, Lockwood, Greenawalt & Dewey
Attys

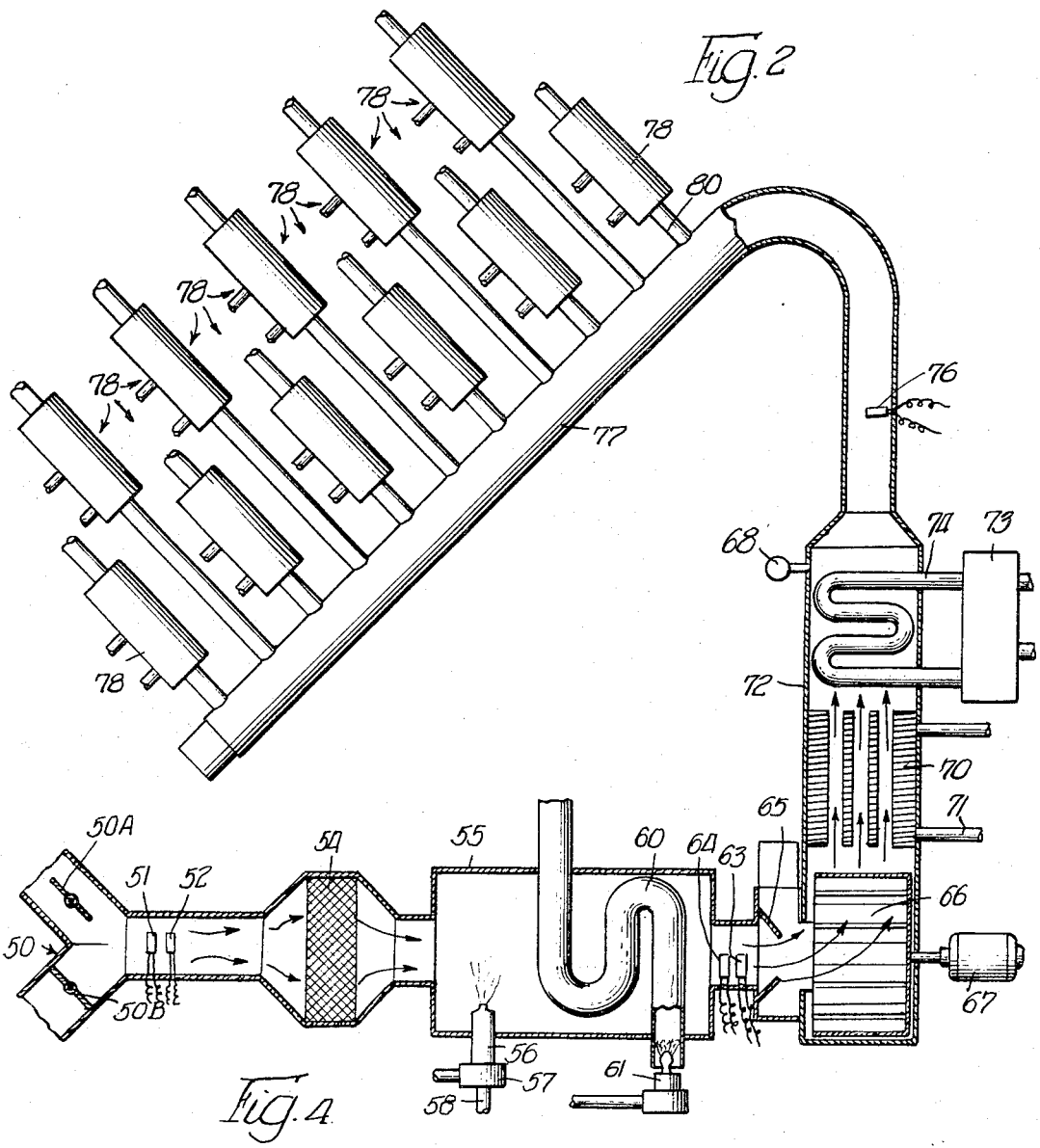

United States Patent Office 3,416,908
Patented Dec. 17, 1968

3,416,908
ENVIRONMENTAL CONTROL SYSTEM FOR
GLASS MANUFACTURING
George I. Goodwin, Bloomfield Hills, and Robert C.
Coblentz, Birmingham, Mich., assignors to Goodwin-
Coblentz Associates, Inc., Pontiac, Mich., a corporation of Michigan
Filed Feb. 1, 1966, Ser. No. 524,285
9 Claims. (Cl. 65—162)

ABSTRACT OF THE DISCLOSURE

An environmental control system for use in the manufacture of glass in which any one or all of the variables in controlling the temperature of glass during manufacture may be determined and regulated. Means is described to maintain control over temperature, pressure, and humidity by artificial means whereby the thermal history of glass may be predetermined for consistent quality in glass manufacture. An alternate system using separately controlled convertor units for control of the cooling environment in various areas during manufacture of glass is also shown.

---

This invention relates to a new and improved means and method of controlling the environment during the manufacture of ceramic, glass and glass-like products as they progress from a molten state to a finally shaped or molded form ready for packaging, shipment and/or sale.

In its broadest sense, the present invention provides means to sense and control the temperature, pressure and humidity of the environment or ambient surroundings of glass or other ceramic products during their manufacture in order to control their quality. Also, the same means senses and controls the temperature of the molds and associated glass handling means during forming whereby the thermal history of ceramic products may be carefully controlled, predetermined and repeated for an optimum production rate and consistent quality of product. The present invention also envisions means to measure and record the temperature, pressure and humidity and control the same throughout the entire manufacturing process as glass is transformed from the molten state into a finished solid article. Through such means the thermal history of glass products manufactured may be controlled and recorded so that subsequent manufacturing operations may be undertaken under the same conditions to provide a uniform high quality product at a maximum manufacturing rate with a minimum amount of rejects due to improper temperature control during formation.

In a typical molding operation for bottles, jugs and the like, molten glass is fed by a chute or other means to a mold in the form of a gob or slug. When once in the mold, a counterblow is delivered to seat the glass or settle the same in the lower part of the mold for formation of the threads and neck. The counterblow is thus described because it is in opposition to the incoming direction of the glass and provides an initial shaping of the gob of glass into a parison. This completes what is known in the trade as a blanking operation and the blanked parison is transferred from the blanked mold to a finish mold by suitable means which holds the parison by the previously formed neck. The second or finishing mold surrounds the glass bottle during a reheating operation and a final blow is effected causing the bottle to expand much in the nature of a balloon to completely fill the mold, the shape of which finally determines its shape. The mold is then stripped from the glass bottle and it is chilled to about 1,000° F. on a dead plate, and then conveyed to a lehr where it is annealed or finished and conveyed to a packing operation.

A number of defects can arise in the product during glass manufacture which are directly traceable to improper machine operation. These can usually be eliminated by adjustment of the machine. One prevalent cause of glass defects which could not heretofore be as easily eliminated was that of improper temperature. For example, if the machine part contacting the glass during forming or conveying is too hot or too cold, or the glass is too hot or too cold for the particular machine operation being performed, defects of different types arise. These may be considered attributable to a lack of control over the temperature environment during glass manufacture. For example, if the finish is cracked or chipped, the glass may be too cold or the mold and/or plunger too cold. If the finish is oval shaped, flattened or pinched, the glass and/or mold could be too hot. In prior art systems, if the product showed effect of too much heat the quantity of outside or plant air used for cooling was increased, or if at maximum, the machine slowed down to permit cooling. Accordingly, the time that it took to form a gob of glass into a finished product was increased, and the time for the glass to reach the fictive state varied with the obvious effect on production, quantity and quality.

In former manufacturing operations, from the time the gob of glass leaves the chute until it enters the lehr for annealing, little or no control was exercised over the rate of cooling of the glass. If defects were noted, the machine speed would be increased or decreased depending on the appearance of the finished product. Untreated outside or plant air was used to cool the molds, dead plate and conveyor when cooling was needed. Naturally on warm days the machine speed was somewhat less than maximum because of poor cooling with the resultant economic effects. Even then actual control over the cooling was somewhat haphazard with reliance on cut and try, rather than known factors. When it is considered that during this period of manufacture the glass will pass through a transformation range which will be at least partially determinative of its quality, the necessity for exercising careful and positive control during this stage of manufacture becomes self-evident.

A better understanding of the structure and method of this invention and how the foregoing problems are obviated may be held by a consideration of the objects to be achieved and a detailed description of its application to a representative glass manufacturing process which follows:

It is an object of this invention to provide a new and improved environment control system.

It is a further object of this invention to provide a new and improved means and method for measuring, controlling and/or recording the temperature, pressure and/or humidity of a cooling medium supplied to selected stages during manufacture of glass products and the like.

It is a further object of this invention to provide a new and improved air control system for use in controlling the temperature of glass products as they undergo transformation from a molten or semi-molten state to a finished solid state, the air control system including a plurality of separate convertor units to provide temperature modifying air at selected stages of manufacture thereby to permit the thermal history of the glass or ceramic products to be predetermined while simultaneously recording the temperatures so as to make information on temperature giving optimum quality available for subsequent runs of products of like kind and quality.

Other objects will become apparent when reference is made to the accompanying drawings wherein:

FIG. 1 is a broken away fragmentary perspective view of a single stage automatic press blow type glass forming machine;

FIG. 2 is a schematic diagram of an air system for use in supplying temperature modifying air to the machine of FIG. 1;

FIG. 3 is an enlarged cross sectional view of one of the convertor units shown in FIG. 2;

FIG. 4 is a block diagram of the glass manufacturing operation; and

FIG. 5 is a block diagram of a typical control system.

While the present invention will be described in conjunction with a glass forming operation involving a molding machine for bottles, jugs and the like, it is to be understood that the present invention is not so limited, as the principles are equally applicable to any type of ceramic or glass forming operations wherein it is necessary or desirable to control the transformation of the material from a molten state to a finished product form.

In the upper right-hand corner of FIG. 1 is shown a fragmentary portion of a hearth forming a tank 11 which contains the molten glass. A chute or nozzle 12 leads from the tank 11 downwardly terminating above a mold platen 13. The chute 12 is mounted so as to rotate about the central axis and move the offset portion 14 over the mold table to feed a gob of molten glass into the mold 16. An air inlet 15 is provided on the chute 12 and joins with spirally arranged conduits (not shown) formed in the walls of the chute, or other type of heat transfer means, whereby the precise temperature of the chute may be controlled by flowing air of a selected temperature, pressure and/or humidity through the conduit. This may be considered to be one zone in which control is desirable.

A blank mold 16 is carried on the mold platen 13 and is positioned to receive a gob of glass or mold charge from the offset portion 14 of the chute 12. The mold charge is formed in a blank mold and is commonly referred to as a parison. A nozzle 17 is positioned above the blank mold 16 and after the chute 12 has delivered the gob of glass, the nozzle 17 delivers a settle blow which forces the gob of glass to fill the bottom of the mold. With the nozzle 17 covering the top of the mold 16, air is supplied from beneath the mold to form the hollow interior of the bottle and simultaneously shape the neck of the blank or parison. After the counterblow operation, the nozzle 17 is retracted to the position shown and the parison is transferred by suitable means of known form (not shown) to the finished mold 18. During such transfer the bottle is turned to an upright position for reception in the finished mold 18 where it is held by the neck portion. A nozzle 19 is received in the neck portion of the parison and air is supplied to inflate the bottle to fill the mold and simultaneously provide internal temperature modification. The nozzle 19 adapted to deliver the final blow to the parison to form the desired shape is then retracted to the position shown. The glass product is then placed over the dead plate 20 for a quick "chill."

Obviously, the temperature of the molds 16 and 18 are subject to change due to the hot glass being received therein and due to the re-heat operation in the finish mold. Accordingly, it is necessary to provide suitable means to control the temperature of the molds either heating or cooling them to the appropriate level to avoid the problems enumerated above.

A plurality of air jets 21 are provided around the mold 16 and are supplied by a feed line 22. In a similar fashion, a plurality of nozzles 23 are positioned around the finished mold 18 and are fed by a feeder line 24. In the past, when uncontrolled outside air was supplied for cooling it was often times cold enough to cause cracking of the mold because of the sharp temperature change. Other times, if too warm the mold cooling was inadequate and the product when removed to transfer to the dead plate 20 would warp and wilt because the glass temperature was above or close to the fictive state.

Obviously, modifying air requirements will depend to a large degree upon the chemical properties and thickness of the glass product being manufactured, and therefore an appropriate modifying temperature may be selected for obtaining optimum mechanical and chemical properties for a given composition molded to a given shape. Once known, this temperature may be repeated for subsequent runs of like kind and quality. The mold temperature may be sensed by a pair of radiation pyrometers 25 and 26 which serve to maintain a constant surveillance of the temperature of the molds 16 and 18 each of which may be considered a separate zone. Obviously, equivalent means for detection of the temperature of the molds is equally satisfactory.

The dead plate 20 is provided with a plurality of openings 27 which serves as an outlet for cooling air supplied to a feeder line 28. The temperature of the glass products transferred to the dead plate may be determined by suitable means such as a radiation pyrometer 30 which is positioned to view the products as they are transferred by suitable means (not shown) to a position above the dead plate for a quick chill by air emitted from the apertures 27.

On reaching the appropriate temperature, the glass product is moved to a continuously moving conveyor 31 having a series of radiation pyrometers 32 or similar means disposed along its length to observe the temperature of the glass products moving along the conveyor 31. A series of plenums 33, 34, 35, 36 and 37 are provided with suitable inlet openings shown fragmentarily to feed the temperature modifying air in controlled amounts at controlled temperatures to the underside of the conveyor 31 which may be a woven wire or other type porous conveyor. The glass products are moved along the conveyor 31 to a lehr (not shown) of conventional design where they are annealed for the desired length of time in an environment in which the temperature, pressure and humidity may be controlled.

The machine shown in FIG. 1 is an exploded schematic view of one section of a multi section Hartford Empire glass forming machine and has certain details omitted to permit greater clarity in describing the present invention.

In summarizing the operation of the machine, glass is fed from the hearth or tank 11 in the form of a gob cut off by suitable means at the top of the chute 12. The gob falls down the chute when the neck 14 is positioned directly over the opening in the mold 16. The nozzle 17 is positioned with the enlarged collar in contact with the mold and air pressure delivered to firmly seat the gob in the lower portion of the mold. Air is delivered from the bottom of the mold to form a bubble within the gob and simultaneously the neck of the bottle is formed. The blank or press is then inverted during transfer to the finished mold 18 where it is reheated and a final blow delivered to give it the intended or designed final shape. The mold is then stripped away and the bottle carried by its neck to a position above the dead plate 20 where a quench or quick chill is provided by air released from the aperture 27. Obviously, two dead plates may be provided if production requirements call for the same, with the second plate being supplied by air in a manner similar to the one shown. The chilled bottle is then placed on the conveyor 31 to transfer to an annealing lehr to complete the manufacturing operation. During the conveying of the bottle to the lehr, control may be exercised over their environment by surveillance at spaced points with radiation pyrometers and automatic adjustment of the temperature, pressure and humidity of the temperature modifying air from the plenums to control the rate of cooling the glass products as they approach the annealing lehr.

Referring now to FIG. 2, a schematic form of an air system to provide controlled temperature modifying air to the air jets described in conjunction with FIG. 1 is illustrated. An air inlet or intake is provided at 50 and may consist of any combination of either outdoor or inside plant air or both. Control of the ratio may be effected by damper valves 50A and 50B. Positioned in the inlet 50 is a temperature sensing means 51 and a humidity sensing means 52 which may be of any suitable type capable of measuring the temperature and humidity level of the incoming air. The results sensed are fed to a control such as a thermostat of known type which may be adjusted to obtain the desired temperature and humidity. The flow of air indicated by the arrows passes through a filter 54 of any known type to remove dust and other foreign particles commonly existing in air around manufacturing plants.

An air treatment chamber 55 is illustrated in cross section and includes a steam jet 66 having a valve 57 of conventional type controlled by a solenoid or the like to admit steam supplied from any suitable source through a pipe 58 to the nozzle 56. The valve is operated by a control which responds to information received by the sensing means 52. When the humidity of the incoming air is below a desired level, the control energizes the solenoid on the valve 57 and the steam jet or nozzle is opened to admit water or moisture to the air. Obviously, a fine mist or spray of tap water is equally well suited and the invention is by no means to be limited to the specific device shown.

If the temperature of the incoming air falls below the desired level, which may be set on a control (not shown) such as a thermostat or the like, a heater stack 60 is warmed by a burner 61 in response to the demand made to the control by the sensor 51. In effect, this function is analogous to the operation of the common residential furnace circuit permitting selection of a temperature which is automatically maintained.

The air exiting the treatment chamber may be further checked for proper humidity and/or temperature by sensing means 63 and 64, while a variable orifice 65 is automatically adjusted to control the pressure and amount of air drawn in by the constant speed fan 66. The variable orifice 65 may comprise one of the types known in the trade as a Vortex manufactured by Clarage Fan Co., Kalamazoo, Michigan. The fan 56 is driven by a constant speed motor 67 to provide uniform air flow along the path illustrated by the arrows. The pressure of the air on the downstream side of the fan may be read on a gauge 68 or the like, with adjustment of the variable orifice to obtain the desired level. If desired, pressure control can be maintained by a sensing means and controller of known type which responds to increases or deceases by adjusting the variable orifice 65 to obtain the selected pressure.

A second stage of air treatment may be provided on the exhaust side of the fan in an air treatment chamber 72. A heat convertor unit 70 receives cooling fluid through line 71 which may be connected to a cooling tower, refrigeration unit or the like. If this is insufficient to cool the air, chilling may be obtained by a chiller package 73 which includes chiller coil 74. Suitable temperature control means responds to a demand made on the control means which is detected by the sensing means 76. Control over the chiller and/or cooling fluid is maintained by an adjustable thermostat or the like which operates an off-on switch for the chiller package or a valve in the cooling line 71 to regulate the flow of cooling fluid through the cooling coils 70 and 74 thereby to cool the air when it is above a selected level.

The treated air is then supplied to a manifold section 77 which feeds a plurality of convertor units all of which may be of similar form and are identified by the single reference 78. Each convertor unit 78 may supply a separate zone or stage of the glass manufacturing operation. For example, one convertor unit can supply the feeder inlet 22 to the air jets 21 surrounding the blanking mold 16. Similar units may be provided for the dead plate and each of the plenums 33–37 along the conveyor.

One of the convertor units 78 is illustrated in enlarged cross sectional schematic form in FIG. 3. The convertor unit is provided with an inlet 80 which is joined to the main manifold section 77. A damper valve 87 may regulate the volume of pretreated air admitted to the convertor unit and act to reduce the pressure of the incoming air if above that desired.

A cooling coil 81 is provided within the convertor 78 and has a valve 82 controlling the flow of cooling fluid from a tower or chiller package. A heating coil 83 may be also provided within the unit with a control element 84 having a sensor 84' in the outlet 86 controlling the operation of the heater 83 and the cooling coil 81 through a relay controlled switch of known form represented by the block 83' and a solenoid operated valve 82. A recorder 85 having a sensor 85' in the outlet 86 continuously records the volume, temperature and humidity of the air leaving the outlet 86 of the convertor unit 78.

In FIG. 5 is illustrated a block diagram of a simple control system for controlling the operation of one zone of the environment control system shown schematically in FIG. 4. For convenience, the control system will be described in connection with temperature control only, however, it will become obvious to those skilled in the art that the same basic control system is equally applicable to controlling humidity and pressure with an appropriate change in components. As is apparent, the control system may be repeated for each zone and/or convertor unit.

The sensing means shown in block form in FIG. 5, constitutes a heat sensing element of known design which detects the temperature of the temperature modifying air on the downstream side of the convertor unit or air treatment chamber and responds to changes by sending a signal to the adjustable control shown in block form. More simply stated, the sensor and adjustable control may constitute a conventional type of two-way thermostat which operates to energize a cooling means when the temperature exceeds a predetermined level, and a heating means when the air temperature falls below a certain level. This is represented by the increase and decrease blocks in the drawing. Obviously, a similar control system is applicable to the other variables of humidity and pressure.

It is contemplated that control systems of this type may be provided at each zone in machines of large size or those where a wide variance in the cooling air temperature requirements is experienced. In machines of smaller size or those where the differential of cooling air temperature requirements is slight, the temperature modifying air only need be treated at the air treatment chamber and thereafter piped to each of the modifying zones through the available distribution system. In this manner, the convertor units may be dispensed with, with the attendant reduction in cost, and over-all simplification of the system.

In operation, on an initial run, the bottles being produced may be observed by a trained operator who can readily recognize defects which are directly or indirectly attributable to improper cooling or heating. The temperature of the temperature modifying air at the particular station at which the defect is located is readily adjusted by the adjustable control. A similar adjustment of pressure and humidity may accompany the temperature adjustment to obtain the optimum desired effect. After the machine has once been adjusted at each zone to obtain the proper temperature for a given composition of glass, formed to a given shape, the information is recorded on each of the recorder units positioned at the respective zones and treatment chamber making it available for subsequent runs. Hence, when the same type of glass product is run with the same or similar type of composition, resort may be had to the recorded information to permit the operator to duplicate temperature modifying conditions at the particular zones which have been proven satisfactory. The glass product is produced free of defects which are traceable to improper cooling or heating of the glass, surrounding medium, and machine parts, which for purposes of this application have been defined as the environment. With the elimination of fluctuation of these factors, defects are immediately eliminated. Regardless of the time of day, barometric pressure, humidity, or outside temperature, consistent quality and optimum quantity may be produced in the machine. The machine operator may easily adjust the temperature modifying rate by simple adjustment of the controls at each zone.

In installations in which a number of convertor units are required, the convertor unit having the greatest pressure demand will necessarily govern the setting of pressure at the treatment chamber. The valves 87 in each of the convertor units may be used to reduce the pressure to the desired level at the zone supplied by the convertor. The temperature of the air leaving the heat treatment chamber may be midway between the high and low demand at the convertor unit with the fine adjustment of the temperature provided by the individual heaters and coolers in each of the convertor units. Obviously, economy in power consumption may dictate something other than a median temperature.

As noted previously, in glass forming machines in which the temperature modifying air is of a relatively constant level of temperature, pressure and humidity, the individual convertor units may be dispensed with and all incoming air treated at the treatment chamber. In the illustrated embodiment, humidity control is provided only in the heat treatment chamber, however, individual humidity sensors and controls to increase or decrease humidity may be provided at each convertor unit if requirements dictate being analogous to that shown at the heat treatment chamber.

With the present system, it is possible to detect the temperature, pressure and humidity content of temperature modifying air and manipulate suitable controls to maintain these variables at an easily selected and predeterminable value. Each particular modifying zone may be controlled to conform to the requirements of the particular stage of manufacture as it is obvious the modifying needs will vary throughout the manufacture of the product. The control system is flexible such that the control points may be selected for the particular glass, ceramic or glass-like product being manufactured.

After considering the foregoing description of the environmental control system, it is evident that the fluctuation in the make-up of incoming air due to day and night as well as seasonal temperatures and changes in barometric pressure and humidity may be readily avoided. Modifying rates are carefully controlled through the control of the variables of humidity, pressure and temperature thus permitting the thermal history of the glass product manufacured to be precisely controlled and repeated. Machine efficiency is thus increased since it may maintain an optimum speed irrespective of the weather conditions as the temperature modifying air will be maintained at the proper level. A record of the best modifying conditions is kept by the recorders for the main supply and each zone so that they may be referred to later to enable selection of the best temperature modifying conditions to obtain any desired physical characteristics of the glass products without further experimentation or the cut and try techniques experienced with machines not equipped with the present invention.

In a pilot experimental installation provided with the present invention, production of glass bottles, jugs or the like by a Hartford Empire machine was increased substantially. The number of units produced per hour was increased slightly, however, there was a significant change in the percentage of acceptable units or those which were suitable for sale. The increase of units per hour produced, coupled with the increase in the percent of saleable units, amounted to in excess of a 10% increase in production of saleable units. When it is considered that machines of this type may run continuously, the increase in acceptable units produced is significant, such that it materially improves the efficiency of the glass manufacturing operation.

Upon a consideration of the foregoing it will become obvious to those skilled in the art that various modifications may be made without departing from the invention embodied herein. Therefore, only such limitations should be imposed as are indicated by the spirit and scope of the appended claims.

We claim:

1. In a machine for forming glass products and the like, means for forming and conveying gobs of glass to a molding means, temperature modifying means to control the temperature of said molding means, said temperature modifying means including air nozzle means to direct temperature modifying air to flow over said molding means, an air intake and conduit means to obtain and convey quantities of said temperature modifying air to said nozzle means, heat exchange means in said conduit means between said intake and said air nozzle means to remove heat energy from at least a portion of said temperature modifying air to cool said temperature modifying air to a selected temperature value below that of said air taken in at said intake, temperature sensing means for sensing the temperature of said temperature modifying air, and control means responsive to said temperature sensing means to adjust said heat exchange means to remove the desired amount of heat energy from said temperature modifying air and maintain said temperature modifying air at a selected value.

2. In a glass product manufacturing plant having a system for use in forming glass products and the like, said system including a melting furnace for melting material for use in forming said glass products, a molding means to shape said glass products, means for forming and conveying gobs of said material from said furnace to said molding means, and means to convey said glass product away from said molding means after forming to a shape sustaining state, the improvement comprising means for controlling the temperature of said glass products during molding, said means for controlling said temperature including air circulating means for obtaining ambient air from outside said manufacturing plant and directing said air to said molding means in said glass forming system after modifying the temperature thereof to thereby control the rate of cooling of said glass products during transformation from a molten to a shape sustaining state, means for cooling the temperature of said temperature modifying air directed to said area of said glass forming system to a point below the temperature of said ambient air outside said manufacturing plant, means for sensing the temperature of said air circulated by said circulating means in said area of said molding means, and control means operatively connected to said cooling means and responsive to said temperature sensing means to control said cooling means to maintain the temperature of said temperature modifying air in said area at a desired value.

3. In a machine for molding glass products, said machine including a molding means to shape said products, the improvement comprising a temperature modifying means to control the temperature of said molding means, said temperature modifying means including nozzle means to direct temperature modifying air against said molding means, an air intake means and conduit means to obtain and convey quantities of said temperature modifying air to said nozzle means, heat exchange means in said conduit means between said intake and said nozzle means to remove heat energy from at least a portion of said temperature modifying air to cool said temperature modifying air to a temperature value below that normally available, sensing means for sensing the temperature of said temperature modifying air, and control means responsive to said temperature sensing means to adjust said heat exchange means to remove the desired amount of heat energy from said temperature modifying air and maintain said temperature modifying air at said value in the area of said molding means.

4. The invention as defined in claim 3 including means to sense the humidity of said temperature modifying air and control means to adjust the humidity of said temperature modifying air to a selected value for optimum cooling effect.

5. The invention as defined in claim 3 including means to sense the pressure of said temperature modifying air and control means to permit adjustment of the pressure of said temperature modifying air.

6. In a machine for molding glass products, said machine including a molding means to shape said products, the improvement comprising an air system, temperature modifying means to control the temperature of said molding means, said temperature modifying means including nozzle means to direct temperature modifying air against said molding means, an air intake means and conduit means to obtain and convey quantities of said temperature modifying air to said nozzle means, heat exchange means in said conduit means between said intake and said nozzle means to remove heat energy from at least a portion of said temperature modifying air to cool said temperature modifying air to a temperature value below that normally available in said system, sensing means for sensing the temperature of said molding means, and control means responsive to said temperature sensing means to adjust said heat exchange means to remove the desired amount of heat energy from said temperature modifying air whereby the temperature of said molding means may be maintained at a desired value.

7. A machine for producing molded glass products and the like, said machine having a molding means, an air system including a temperature modifying means for supplying cooling air to control the temperature of said molding means, said temperature modifying means including a conduit and a means at one end of said conduit to direct said cooling air against said molding means, an intake means for admitting said cooling air into said system, a heat exchange means for chilling said cooling air to a temperature lower than is otherwise available in said system, sensing means for sensing the temperature of said cooling air, control means cooperating with said sensing means to adjust the heat exchange means and thereby adjust the temperature of said air for optimum cooling of said molding means.

8. In a machine for molding glass products, said machine including a molding means to shape said products, the improvement comprising an air system, temperature modifying means to control the temperature of said molding means, said temperature modifying means including nozzle means to direct temperature modifying air against said molding means, and air intake means and condiut means to obtain and convey quantities of said temperature modifying air to said nozzle means, a cooling means cooperating with a heat exchange means in said conduit means betwen said intake and said nozzle means to remove heat energy from at least a portion of said temperature modifying air to cool said temperature modifying air to a temperature value below that normally available in said system, sensing means for sensing the temperature of said molding means, and control means responsive to said temperature sensing means to adjust said heat exchange means through said cooling means to remove the desired amount of heat energy from said temperature modifying air whereby the temperature of said molding means may be maintained at a desired value.

9. A machine for producing molded glass products and the like, said machine having a molding means, an air system including a temperature modifying means for supplying cooling air to control the temperature of said molding means, said tempearture modifying means including a conduit and a means at one end of said conduit to direct said cooling air against said molding means, an intake means for admitting said cooling air into said system, a heat exchange means for chilling said cooling air to a temperature lower than is otherwise available in said system, cooling means to supply cooling fluid to said heat exchange means, sensing means for sensing the temperature of said cooling air, and control means cooperating with said sensing means to adjust said cooling means to control the fluid flowing to the heat exchange means and thereby adjust the temperature of said air for optimum cooling of said molding means.

References Cited

UNITED STATES PATENTS

| 1,167,740 | 1/1916 | Carrier | 236—44 |
| 2,569,339 | 9/1951 | Russell | 65—162 |
| 2,660,832 | 12/1953 | Merrill | 65—161 |
| 2,917,871 | 12/1959 | Atkeson | 65—161 |
| 3,271,122 | 9/1966 | Denniston et al. | 65—12 X |

DONALL H. SYLVESTER, *Primary Examiner.*

A. D. KELLOGG, *Assistant Examiner.*

U.S. Cl. X.R.

65—111, 161, 355; 236—44